US006480629B1

(12) United States Patent
Bakhmutsky

(10) Patent No.: US 6,480,629 B1
(45) Date of Patent: Nov. 12, 2002

(54) MOTION ESTIMATION METHOD USING ORTHOGONAL-SUM BLOCK MATCHING

(75) Inventor: Michael Bakhmutsky, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/287,161

(22) Filed: Apr. 6, 1999

(51) Int. Cl.$^7$ ................................................. G06K 9/36
(52) U.S. Cl. ..................................... 382/236; 348/407.1
(58) Field of Search ....................... 382/236; 348/407.1, 348/412.1, 413.1, 422.1

(56) References Cited

PUBLICATIONS

Lu X Et Al: "Improved Fast Motion Estimation Using Integral Projection Features for Hardware Implementation", IEEE Int'l Symposium on Circuits and Systems, US, NY, IEEE, Jun. 9, 1997, pp. 1337–1340, XP000832452, ISBN: 0–7803–3584–8.

Joon–Seek Kim Et Al: "A Fast Feature–Based Block Matching Algorithm Using Integral Projections", IEEE Journal on Selected Areas in Communications, US, IEEE Inc. NY vol. 10, No. 5, Jun. 1 1992, pp. 968–971, XP000276102, ISSN: 0733–8716.

Pan S. B. Et Al: "VLSI Architectures for Block Matching Algorithms Using Systolic Arrays", IEEE Transactions on Circuits and Systems for Video Technology, US, IEEE, Inc. NY, vol. 6, No. 1, Feb. 1, 1996, pp. 67–73, XP000625580, ISSN: 1051–8215.

Ogura E. Et Al: "A Cost Effective Motion Estimation Processor LSI Using a Simple and Efficient Algorithm", IEEE Transactions On Consumer Electronics, US, IEEE Inc. NY. vol. 41, No. 3, Aug. 1, 1995, pp. 690–696, XP000539525, ISSN: 0098–3063.

*Primary Examiner*—Yon J. Couso
(74) *Attorney, Agent, or Firm*—Russell Gross

(57) ABSTRACT

A method for determining a best match between a first pixel array in a picture currently being encoded and a plurality of second pixel arrays in a search region of a reference picture, wherein each of the first and second pixel arrays includes a plurality of rows and columns of individual pixel values. The method is designed to be performed in a motion estimation search engine of a digital video encoder, and includes the steps of producing a first orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array; producing a plurality of second orthogonal-sum signatures for respective ones of at least selected ones of the plurality of second pixel arrays, each of the plurality of second orthogonal-sum signatures being comprised of a set of horizontal sums representative of the sums of the individual pixel values of the rows of a respective one of the second pixel arrays and a set of vertical sums representative of the sums of the individual pixel values of the columns of a respective one of the second pixel arrays; and, comparing the first orthogonal-sum signature with each of the second orthogonal-sum signatures in order to determine the best match between the first and second pixel arrays. In a disclosed embodiment, the first and second pixel arrays are either decimated or undecimated macroblocks having a structure defined by an MPEG standard, e.g., the MPEG-2 standard.

15 Claims, 2 Drawing Sheets

MOTION ESTIMATION METHOD USING ORTHOGONAL-SUM BLOCK MATCHING

BACKGROUND OF THE INVENTION

The present invention relates generally to digital video compression, and, more particularly, to a hardware-efficient method of motion estimation in digital video encoders that is simpler, faster, and less expensive than the presently available technology.

Many different compression algorithms have been developed in the past for digitally A encoding video and audio information (hereinafter referred to generically as "digital video data stream") in order to minimize the bandwidth required to transmit this digital video data stream for a given picture quality. Several multimedia specification committees have established and proposed standards for encoding/compressing and decoding/decompressing audio and video information. The most widely accepted international standards have been proposed by the Moving Pictures Expert Group (MPEG), and are generally referred to as the MPEG-1 and MPEG-2 standards. Officially, the MPEG-1 standard is specified in the ISO/IEC 11172-2 standard specification document, which is herein incorporated by reference, and the MPEG-2 standard is specified in the ISO/IEC 13818-2 standard specification document, which is also herein incorporated by reference. These MPEG standards for moving picture compression are used in a variety of current video playback products, including digital versatile (or video) disk (DVD) players, multimedia PCs having DVD playback capability, and satellite broadcast digital video. More recently, the Advanced Television Standards Committee (ATSC) announced that the MPEG-2 standard will be used as the standard for Digital HDTV transmission over terrestrial and cable television networks. The ATSC published the *Guide to the Use of the ATSC Digital Television Standard* on Oct. 4, 1995, and this publication is also herein incorporated by reference.

In general, in accordance with the MPEG standards, the audio and video data comprising a multimedia data stream (or "bit stream") are encoded/compressed in an intelligent manner using a compression technique generally known as "motion coding". More particularly, rather than transmitting each video frame in its entirety, MPEG uses motion estimation for only those log parts of sequential pictures that vary due to motion, where possible. In general, the picture elements or "pixels" of a picture are specified relative to those of a previously transmitted reference or "anchor" picture using differential or "residual" video, as well as so-called "motion vectors" that specify the location of a 16-by-16 array of pixels or "macroblock" within the current picture relative to its original location within the anchor picture. Three main types of video frames or pictures are specified by MPEG, namely, I-type, P-type, and B-type pictures.

An I-type picture is coded using only the information contained in that picture, and hence, is referred to as an "intra-coded" or simply, "intra" picture.

A P-type picture is coded/compressed using motion compensated prediction (or "motion estimation") based upon information from a past reference (or "anchor") picture (either I-type or P-type), and hence, is referred to as a "predictive" or "predicted" picture.

A B-type picture is coded/compressed using motion compensated prediction (or "motion estimation") based upon information from either a past and or a future reference picture (either I-type or P-type), or both, and hence, is referred to as a "bidirectional" picture. B-type pictures are usually inserted between I-type or P-type pictures, or combinations of either.

The term "intra picture" is used herein to refer to I-type pictures, and the term "non-intra picture" is used herein to refer to both P-type and B-type pictures. It should be mentioned that although the frame rate of the video data represented by an MPEG bit stream is constant, the amount of data required to represent each frame can be different, e.g., so that one frame of video data (e.g., $\frac{1}{30}$ of a second of playback time) can be represented by x bytes of encoded data, while another frame of video data can be represented by only a fraction (e.g., 5%) of x bytes of encoded data. Since the frame update rate is constant during playback, the data rate is variable.

In general, the encoding of an MPEG video data stream requires a number of steps. The first of these steps consists of partitioning each picture into macroblocks. Next, in theory, each macroblock of each "non-intra" picture in the MPEG video data stream is compared with all possible 16-by-16 pixel arrays located within specified vertical and horizontal search ranges of the current macroblock's corresponding location in the anchor picture(s). This theoretical "full search algorithm" (i.e., searching through every possible block in the search region for the best match) always produces the best match, but is seldom used in real-world applications because of the tremendous amount of calculations that would be required, e.g., for a block size of N×N and a search region of (N+2w) by (N+2w), the distortion function MAE has to be calculated $(2w+1)^2$ times for each block, which is a tremendous amount of calculations. Rather, it is used only as a reference or benchmark to enable comparison of different more practical motion estimation algorithms that can be executed far faster and with far fewer computations. These more practical motion estimation algorithms are generally referred to as "fast search algorithms".

The aforementioned search or "motion estimation" procedure, for a given prediction mode, results in a motion vector that corresponds to the position of the closest-matching macroblock (according to a specified matching criterion) in the anchor picture within the specified search range. Once the prediction mode and motion vector(s) have been determined, the pixel values of the closest-matching macroblock are subtracted from the corresponding pixels of the current macroblock, and the resulting 16-by-16 array of differential pixels is then transformed into 8-by-8 "blocks," on each of which is performed a discrete cosine transform (DCT), the resulting coefficients of which are each quantized and Huffman-encoded (as are the prediction type, motion vectors, and other information pertaining to the macroblock) to generate the MPEG bit stream. If no adequate macroblock match is detected in the anchor picture, or if the current picture is an intra, or "I-" picture, the above procedures are performed on the actual pixels of the current macroblock (i.e., no difference is taken with respect to pixels in any other picture), and the macroblock is designated an "intra" macroblock.

For all MPEG-2 prediction modes, the fundamental technique of motion estimation consists of comparing the current macroblock with a given 16-by-16 pixel array in the anchor picture, estimating the quality of the match according to the specified metric, and repeating this procedure for every such 16-by-16 pixel array located within the search range. The hardware or software apparatus that performs this search is usually termed the "search engine," and there exists a number of well-known criteria for determining the quality of the match. Among the best-known criteria are the Minimum Absolute Error (MAE), in which the metic consists of the sum of the absolute values of the differences of each of the 256 pixels in the macroblock with the corresponding pixel in the matching anchor picture macroblock; and the Minimum Square Error (MSE), in which the metric consists of the sum of the squares of the above pixel differences. In either case, the match having the smallest value of the corresponding sum is selected as the best match within the specified search range, and its horizontal and vertical positions relative to the current macroblock therefore constitute the motion vector. If the resulting minimum sum is nevertheless deemed too large, a suitable match does not exist for the current macroblock, and it is coded as an intra macroblock. For the purposes of the present invention, either of the above two criteria, or any other suitable criterion, may be used.

The various fast search algorithms evaluate the distortion function (e.g., the MAE function) only at a predetermined subset of the candidate motion vector locations within the search region, thereby reducing the overall computational effort. These algorithms are based on the assumption that the distortion measure is monotonically decreasing in the direction of the best match prediction. Even though this assumption is not always true, it can still find a suboptimal motion vector with much less computation.

The most commonly used approach to motion estimation is a hybrid approach generally divided into several processing steps. First, the image can be decimated by pixel averaging. Next, the fast search algorithm operating on a smaller number of pixels is performed, producing a result in the vicinity of the best match. Then, a full search algorithm in a smaller search region around the obtained motion vector is performed. If half-pel vectors are required (as with MPEG-2), a half-pel search is performed as a separate step or is combined with the limited full search.

Even with the great savings that can be achieved in the hybrid approach to motion estimation, an enormous amount of computations still have to be performed for each iteration of computing MAE. Assuming that the distortion function has to be computed every clock cycle for every block offset, which is desirable in demanding applications such as MPEG-2 HDTV where motion block size is 16-by-16, a distortion function computational unit (DFCU) will consist of a number of simpler circuits of increasing bit width starting from 8 (8-bit luminance data is used for motion estimation) to produce MAE. This number will be equal to the sum of the following: 256 subtraction circuits, 256 absolute value compute circuits, 255 summation circuits of increasing bit width, for a total of 757 circuits of increasing bit width starting with 8, per DFCU.

Depending on picture resolution, a number of these extremely complex units will be required for a practical system. Using a smaller number of circuits within a DFCU in order to reuse its hardware is possible, but will substantially increase processing time and may not be acceptable in demanding applications such as HDTV. In this case, the number of DFCUs will simply have to be increased to compensate by enhanced parallel processing.

The first step in the hybrid approach to motion estimation (rough search) is usually the most demanding step in terms of hardware utilization because it has to cover the largest search region in order to produce a reasonably accurate match.

Based on the above and foregoing, there presently exists a need in the art for a method for motion estimation that enhances the speed at which motion estimation can be performed, that greatly reduces the amount and complexity of the motion estimation or DFCU hardware required to perform motion estimation, and that provides for significant picture quality improvement at a reasonable cost. The present invention fulfills this need in the art. In overview, the method of the present invention searches for best matches by comparing unique macroblock signatures rather than by comparing the individual luminance values of the collocated pixels in the current macroblock and the search region. This method is based on the same assumption as all fast search algorithms are based on, i.e., that the distortion measure is monotonically decreasing in the direction of the best match prediction.

SUMMARY OF THE INVENTION

The present invention encompasses a method for determining a best match between a first pixel array in a picture currently being encoded and a plurality of second pixel arrays in a search region of a reference picture, wherein each of the first and second pixel arrays includes a plurality of rows and columns of individual pixel values. The method is designed to be performed in a motion estimation search engine of a digital video encoder, and includes the steps of producing a first orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array; producing a plurality of second orthogonal-sum signatures for respective ones of at least selected ones of the plurality of second pixel arrays, each of the plurality of second orthogonal-sum signatures being comprised of a set of horizontal sums representative of the sums of the individual pixel values of the rows of a respective one of the second pixel arrays and a set of vertical sums representative of the sums of the individual pixel values of the columns of a respective one of the second pixel arrays; and, comparing the first orthogonal-sum signature with each of the second orthogonal-sum signatures in order to determine the best match between the first and second pixel arrays. In a disclosed embodiment, the first and second pixel arrays are either decimated or undecimated macroblocks having a structure defined by an MPEG standard, e.g., the MPEG-2 standard.

The present invention also encompasses a device, e.g., a motion estimation search engine of a digital video encoder, that implements the method of the present invention.

BRIEF DESCRIPTION OF THE DRAWINGS

These and other objects, features, and advantages of the present invention will be readily understood from the following detailed description taken in conjunction with the accompanying drawings, in which.

DETAILED DESCRIPTION OF THE INVENTION

In overview, the motion estimation method of the present invention generally consists of the following steps. First, the individual pixel values of each row and column of a current macroblock are summed, to produce a set of orthogonal sums that represent a unique pattern or "signature" of that macroblock's content. Next, the resultant orthogonal-sum signature of that macroblock is compared with the corresponding orthogonal-sum signatures of each macroblock-sized pixel array in a prescribed search region of the reference or anchor picture(s), and a search is made for the best match according to a prescribed matching criterion or search metric, e.g., the Minimum Absolute Error (MAE) distortion function. Because it is statistically improbable that macroblocks having different contents will have the same signature, there is a low probability of a false match. Further, since the orthogonal sums represent an average luminance magnitude per line (row) or column, small-step increments in the macroblock origin within the search region will not be able to produce large jumps in magnitude for bandwidth-limited filtered video. For this reason, it can be concluded that the distortion measure computed based on matching the orthogonal sum sets will be monotonically decreasing in the direction of the best match prediction as well as in the prior art search methods.

Figure 1A:
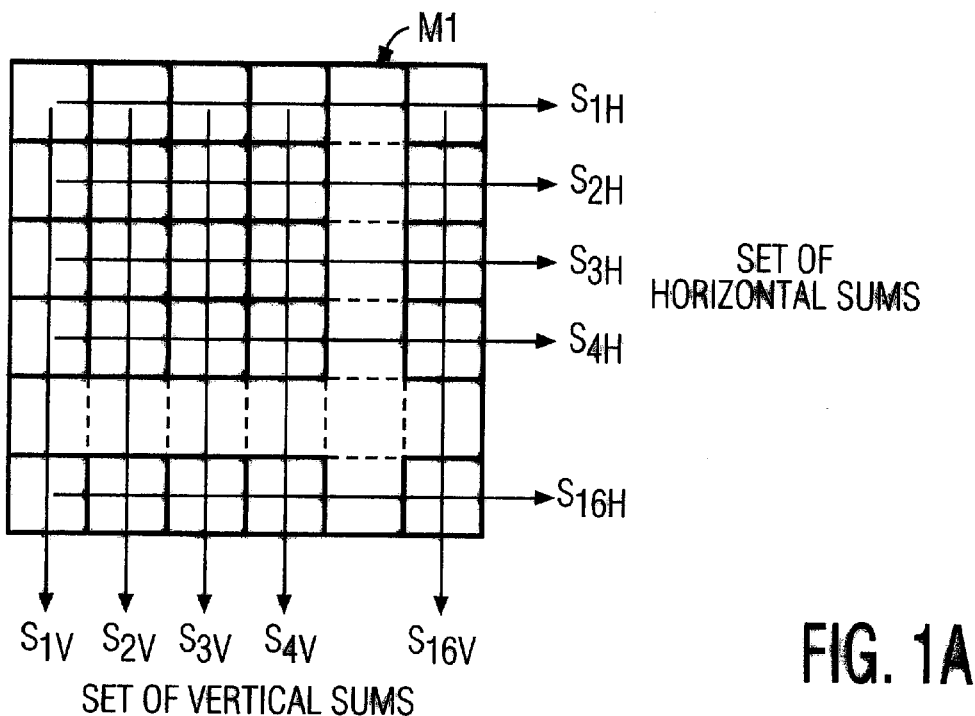
FIG. 1A is a diagram that illustrates a 32-orthogonal sum signature for an undecimated 16-by-16 macroblock.
Figure 1B:
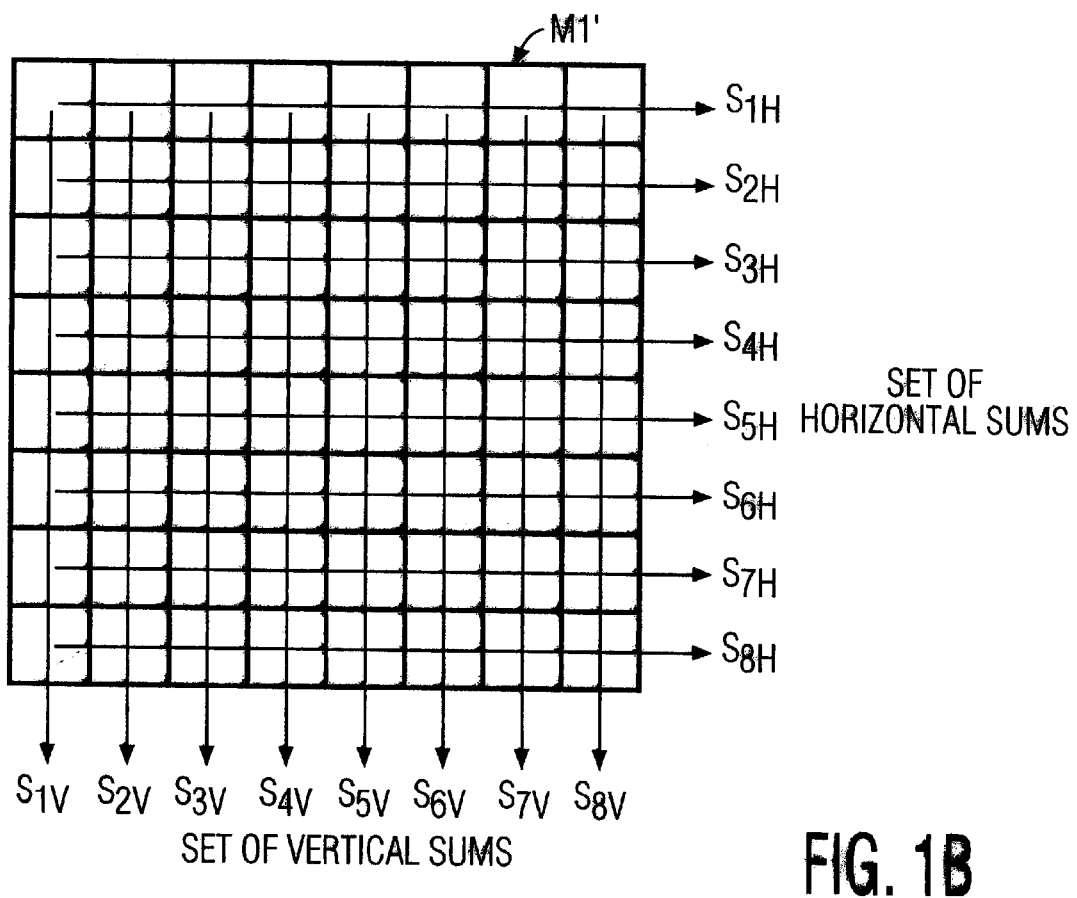
FIG. 1B is a diagram that illustrates a 16-orthogonal sum signature for an 8-by-8 macroblock that represents a 2:1 decimated 16-by-16 macroblock; and, FIG. 2 is a combination flow chart and graph that illustrates best match estimation in accordance with a preferred embodiment of the present invention.

With reference now to FIGS. 1A and 1B, specific illustrations of the motion estimation method of the present invention will now be described. More particularly, with reference now to FIG. 1A, the individual pixel (luminance) values for each row (1H–16H) and for each column (1V–16V) of an undecimated 16-by-16 macroblock M1 are summed, to thereby produce a set of orthogonal sums $S_{1H}$ to $S_{16H}$ (horizontal sums) and $S_{1V}$ to $S_{16V}$ (vertical sums) that collectively constitute the orthogonal-sum signature of the undecimated 16-by-16 macroblock M1. With reference now to FIG. 1B, the individual pixel (luminance) values for each row (1H–8H) and for each column (1V–8V) of the 8-by-8 macroblock M1' are summed, to thereby produce a set of orthogonal sums $S_{1H}$ to $S_{8H}$ (horizontal sums) and $S_{1V}$ to $S_{8V}$ (vertical sums) that collectively constitute the orthogonal-sum signature of the 8-by-8 macroblock M1'. The 8-by-8 macroblock M1' constitutes the macroblock M1 decimated 2:1 both horizontally and vertically.

Figure 2:
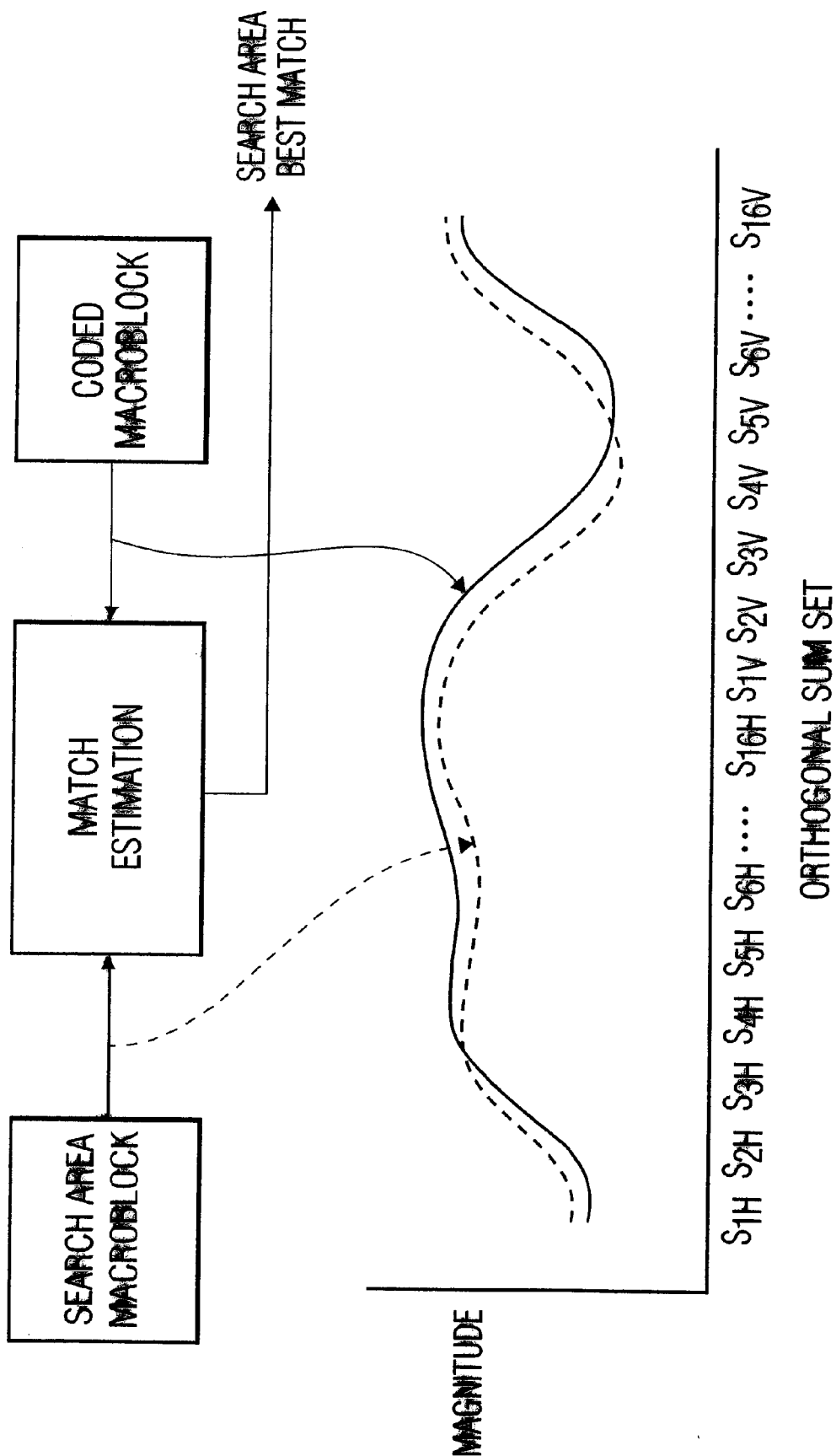

With reference now to FIG. 2, the motion estimation method of the present invention is performed as follows. More particularly, a best match estimation procedure is carried out by comparing the orthogonal-sum signatures of a current coded macroblock with the orthogonal-sum signatures of each macroblock in a specified search region of a reference or anchor picture, and then selecting as the best match the reference (search area) macroblock that has the highest degree of correlation with the orthogonal sum set of the current macroblock according to a specified matching criterion (search metric), e.g., MAE, MSE, or any other suitable metric.

Due to the high complexity of the distortion function computational unit (DFCU), the motion estimation search is normally performed at least initially on decimated video (i.e., decimated macroblocks). For example, in the case of generating orthogonal sum sets for an undecimated macroblock depicted in FIG. 1A, the number of sums representing the 16-by-16 macroblock's orthogonal-sum signature is 32 (2×16), whereas in the case of generating orthogonal sum sets for a 2:1 decimated macroblock depicted in FIG. 1B, the number of sums representing the 8-by-8 macroblock's orthogonal-sum signature is reduced to 16 (2×8). It is quite apparent that evaluating a distortion function for 2N numbers will substantially reduce the DFCU computational requirements relative to the existing technology that requires that the distortion function be evaluated for $N^2$ numbers. For example, in the case of the undecimated 16-by-16 macroblock depicted in FIG. 1A, the distortion function has to be evaluated for 8 times less numbers (256/32), and in the case of the decimated 8-by-8 macroblock depicted in FIG. 1B, the distortion function has to be evaluated for 4 times less numbers (64/16).

As stated previously, the computational complexity of the DFCU is a major factor in the cost of the motion estimation circuitry (search engine). However, since the motion estimation method of the present invention provides such a dramatic reduction in the cost and complexity of the DFCU, it becomes much more practical to start with undecimated or low-level decimated video for motion estimation searching, thereby improving motion estimation search accuracy, and ultimately, picture quality. In this connection, not only does the motion estimation method of the present invention allow a substantial reduction in the number of stages of motion estimation, but it also allows for the elimination of the special video filtering circuitry required for all eliminated decimation stages. With such hardware savings, the search process can potentially be started with the undecimated video producing a great quality improvement at reasonable cost.

Another advantage realized with the motion estimation method of the present invention is greatly enhanced speed of operation. Traditionally, multiple stages of logic are required in order to compare collocated luminance magnitudes, practically excluding the possibility of obtaining results in a single clock cycle. For this reason, either the system clock frequency has to be substantially reduced or the system has to be pipelined utilizing substantial logic resources. The motion estimation method of the present invention allows for concurrent computation of orthogonal sums easily achieved in a single clock cycle, followed by dramatically reduced MAE computation.

In addition to these advantages, the invention greatly reduces the cross-communication between computations performed on the data originating in different memories. This allows for precomputation and storage of intermediate results (orthogonal sums) prior to motion estimation which can be very beneficial in some hardware architectures.

Although preferred embodiments of the present invention have been described in detail hereinabove, it should be clearly understood that many variations and/or modifications of the basic inventive concepts taught herein that may appear to those skilled in the pertinent art will still fall within the spirit and scope of the present invention, as defined in the appended claims. For example, although the present invention is described as being applicable to digital video encoders, it should be clearly understood that the present invention is not limited to any particular application, e.g., it can be used in a decoder portion of a television set or other picture display system when it is necessary to encode the received picture to accommodate the requirements of the television set or other picture display system.

What is claimed is:

1. A method implemented in a motion estimation search engine for comparing a first pixel array having a plurality of rows and columns of individual pixel values, and a second pixel array having a plurality of rows and columns of individual pixel values, the method comprising the steps of:

summing the individual pixel values of each row of individual pixel values of the first pixel array to produce a first set of horizontal sums;

summing the individual pixel values of each column of individual pixel values of the first pixel array to produce a first set of vertical sums;

summing the individual pixel values of each row of individual pixel values of the second pixel array to produce a second set of horizontal sums;

summing the individual pixel values of each column of individual pixel values of the second pixel array to produce a second set of vertical sums;

wherein the first set of horizontal sums and the first set of vertical sums comprises a first set of orthogonal sums, wherein the second set of horizontal sums and the second set of vertical sums comprises a second set of orthogonal sums, and, comparing the first set of orthogonal sums and the second set of orthogonal sums in order to determine if the second pixel array is a best match to the first pixel array.

2. The method as set forth in claim 1, wherein the first pixel array comprises of an undecimated macroblock of a picture currently being encoded, and the second pixel array comprises an undecimated macroblock in a search region of a reference picture.

3. The method as set forth in claim 1, wherein the first pixel array comprises of a decimated macroblock of a picture currently being encoded, and the second pixel array comprises a decimated macroblock in a search region of a reference picture.

4. The method as set forth in claim 1, wherein the first and second pixel arrays are macroblocks having a structure defined by an MPEG standard.

5. A method implemented in a motion estimation search engine for determining a best match between a first pixel array in a picture currently being encoded and a plurality of second pixel arrays in a search region of a reference picture, wherein each of the first and second pixel arrays includes a plurality of rows and columns of individual pixel values, the method comprising the steps of:

providing a first orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array;

providing a plurality of second orthogonal-sum signatures for respective ones of at least selected ones of the plurality of second pixel arrays, each of the plurality of second orthogonal-sum signatures being comprised of a set of horizontal sums representative of the sums of the individual pixel values of the rows of a respective one of the second pixel arrays and a set of vertical sums representative of the sums of the individual pixel values of the columns of a respective one of the second pixel arrays; and, comparing the first orthogonal-sum signature with each of the second orthogonal-sum signatures in order to determine the best match between the first and second pixel arrays.

6. The method as set forth in claim 5, wherein the comparing step is performed using a prescribed best match search metric.

7. The method as set forth in claim 6, wherein the prescribed best match search metric is a Minimum Absolute Error (MAE) search metric.

8. The method as set forth in claim 5, wherein the first and second pixel arrays are each macroblocks having a structure defined by an MPEG standard.

9. The method as set forth in claim 8, wherein the MPEG standard is the MPEG-2 standard.

10. The method as set forth in claim 8, wherein each of the macroblocks is an undecimated macroblock.

11. The method as set forth in claim 8, wherein each of the macroblocks is a decimated macroblock.

12. A motion estimation search engine for determining a best match between a first pixel array in a picture currently being encoded and a plurality of second pixel arrays in a search region of a reference picture, wherein each of the first and second pixel arrays includes a plurality of rows and a plurality of columns of individual pixel values, the motion estimation search engine including:

circuitry that provides a first orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array, and that provides a plurality of second orthogonal-sum signatures for respective ones of at least selected ones of the plurality of second pixel arrays, each of the plurality of second orthogonal-sum signatures being comprised of a set of horizontal sums representative of the sums of the individual pixel values of the rows of a respective one of the second pixel arrays and a set of vertical sums representative of the sums of the individual pixel values of the columns of a respective one of the second pixel arrays; and, circuitry that compares the first orthogonal-sum signature with each of the second orthogonal-sum signatures in order to determine the best match between the first and second pixel arrays.

13. The motion estimation search engine as set forth in claim 12, wherein the first and second pixel arrays are each macroblocks having a structure defined by an MPEG standard.

14. A motion estimation search engine for determining a best match between a first pixel array in a picture currently being encoded and a plurality of second pixel arrays in a search region of a reference picture, wherein each of the first and second pixel arrays includes a plurality of rows and a plurality of columns of individual pixel values, the motion estimation search engine including:

means for providing a first orthogonal-sum signature of the first pixel array comprised of a set of horizontal sums representative of the sums of the individual pixel values of the rows of the first pixel array and a first set of vertical sums representative of the sums of the individual pixel values of the columns of the first pixel array, and for providing a plurality of second orthogonal-sum signatures for respective ones of at least selected ones of the plurality of second pixel arrays, each of the plurality of second orthogonal-sum signatures being comprised of a set of horizontal sums representative of the sums of the individual pixel values of the rows of a respective one of the second pixel arrays and a set of vertical sums representative of the sums of the individual pixel values of the columns of a respective one of the second pixel arrays; and, means for comparing the first orthogonal-sum signature with each of the second orthogonal-sum signatures in order to determine the best match between the first and second pixel arrays.

15. The motion estimation search engine as set forth in claim 14, wherein the first and second pixel arrays are each macroblocks having a structure defined by an MPEG standard.

* * * * *